United States Patent
Gosis et al.

(10) Patent No.: US 8,631,830 B2
(45) Date of Patent: Jan. 21, 2014

(54) SEMI-DISPOSABLE PRE-CONDITIONED AIR SUPPLY HOSE CONDUIT AND CONNECTORS FOR ATTACHING END PORTIONS OF THE SAME

(75) Inventors: Anatoly Gosis, Palatine, IL (US); Scott Takayuki Koizumi, Fairfield, CA (US); Folkert Fred Koch, San Ramon, CA (US)

(73) Assignee: Illinois Tool Works Inc., Glenview, IL (US)

( * ) Notice: Subject to any disclaimer, the term of this patent is extended or adjusted under 35 U.S.C. 154(b) by 1625 days.

(21) Appl. No.: 11/681,644

(22) Filed: Mar. 2, 2007

(65) Prior Publication Data

US 2007/0216155 A1 Sep. 20, 2007

Related U.S. Application Data

(60) Provisional application No. 60/781,843, filed on Mar. 13, 2006.

(51) Int. Cl.
*F16L 9/00* (2006.01)

(52) U.S. Cl.
USPC ..... 138/109; 138/104; 138/155; 138/DIG. 11

(58) Field of Classification Search
USPC .......................... 138/104, 109, 155, DIG. 11
See application file for complete search history.

(56) References Cited

U.S. PATENT DOCUMENTS

| | | | | |
|---|---|---|---|---|
| 1,820,845 A | * | 8/1931 | Royal | 138/109 |
| 2,025,067 A | * | 12/1935 | Miller | 285/148.23 |
| 2,449,754 A | * | 9/1948 | Oskar Seitz | 285/4 |
| 3,076,669 A | * | 2/1963 | Schlein | 285/179 |
| 3,995,888 A | | 12/1976 | McIlroy | |
| 4,344,357 A | * | 8/1982 | Mittelkotter | 454/172 |
| 4,361,079 A | * | 11/1982 | Christensen et al. | 454/172 |
| 5,143,123 A | * | 9/1992 | Richards et al. | 138/120 |
| 5,143,408 A | * | 9/1992 | Holtsmark | 285/93 |
| 5,635,675 A | * | 6/1997 | Houga | 174/68.3 |
| 5,937,912 A | * | 8/1999 | Ally | 138/177 |
| 5,992,469 A | * | 11/1999 | Hegler | 138/109 |
| 6,394,505 B1 | | 5/2002 | Schmucki et al. | |
| 6,399,002 B1 | * | 6/2002 | Lupke et al. | 264/139 |
| 6,595,554 B2 | * | 7/2003 | Byrnes | 285/179 |
| 6,883,552 B2 | * | 4/2005 | Ooyauchi et al. | 138/177 |
| 2003/0051763 A1 | * | 3/2003 | Buttner et al. | 138/121 |

FOREIGN PATENT DOCUMENTS

| | | |
|---|---|---|
| DE | 3407500 A1 | 9/1985 |
| DE | 8706044 U1 | 9/1987 |
| WO | 9938669 A1 | 8/1999 |

* cited by examiner

*Primary Examiner* — James Hook
(74) *Attorney, Agent, or Firm* — Fletcher Yoder P.C.

(57) ABSTRACT

A tubular fluid conduit which is especially adapted for use in supplying pre-conditioned air to an aircraft being serviced, wherein the tubular conduit may be fabricated as a thermoplastic extrusion having a constant diameter dimension, whereby a first end portion may be fluidically connected to a large diameter supply conduit while a second end portion may be fluidically connected to a small diameter use conduit as a result of spiral wrapping the second end portion around the use conduit. Alternatively, the tubular conduit may be fabricated as a thermoplastic extrusion having repetitive sections with each section comprising relatively large diameter and relatively small diameter portions.

16 Claims, 1 Drawing Sheet

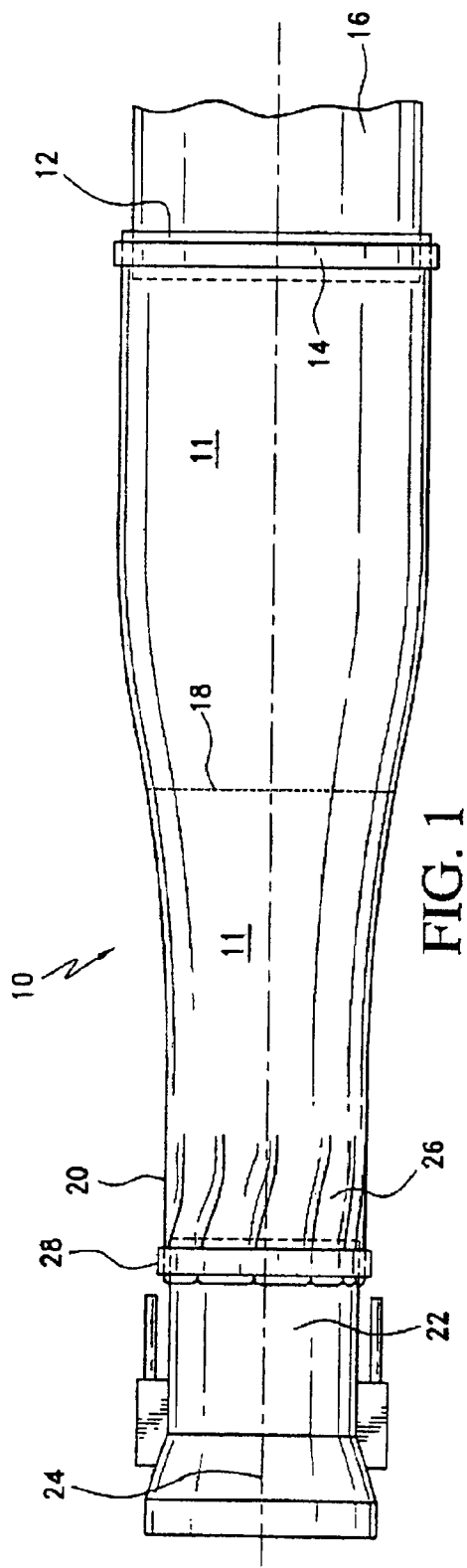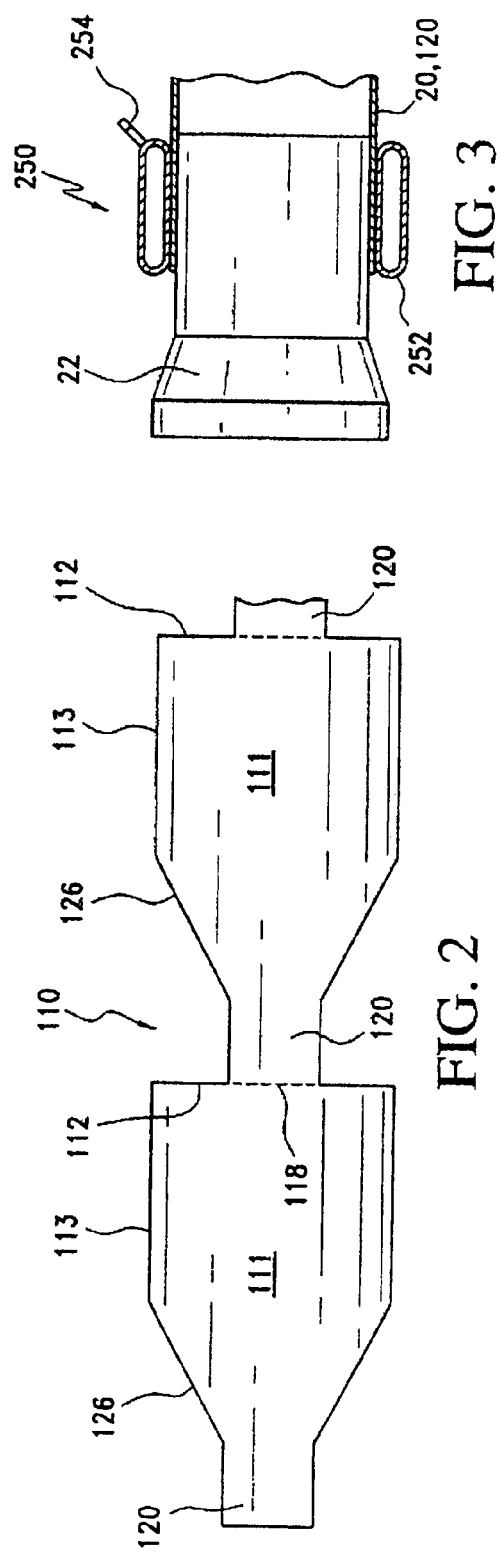

SEMI-DISPOSABLE PRE-CONDITIONED AIR SUPPLY HOSE CONDUIT AND CONNECTORS FOR ATTACHING END PORTIONS OF THE SAME

CROSS REFERENCE TO RELATED APPLICATION

This application claims priority to U.S. Provisional Application No. 60/781,843, filed on Mar. 13, 2006, which is hereby incorporated by reference.

FIELD OF THE INVENTION

The present invention relates generally to tubular fluid conduits, and more particularly to a new and improved tubular fluid conduit which is especially adapted for use in supplying pre-conditioned air to an aircraft while, for example, the aircraft is located upon the ground and being serviced, during which time the aircraft is unable to generate its own supply of conditioned air for the crew and passengers, wherein the tubular conduit may be fabricated, in accordance with a first embodiment, as a thermoplastic extrusion which has a constant diametrical dimension, or which may be fabricated, in accordance with a second embodiment, as a thermoplastic extrusion which effectively has repetitive length sections wherein each one of the repetitive length sections has a relatively large diameter end portion and a relatively small diameter end portion. In accordance with the first embodiment, while the diametrical extent of the extrusion is constant, the opposite end portions thereof may be respectively secured to fluid conduits having different, relatively large and relatively small diametrical dimensions by attaching one end portion of the tubular conduit extrusion to the relatively large diameter fluid conduit, and spirally gathering or folding the other end portion of the tubular conduit extrusion around the longitudinal axis thereof so as to be attached to the relatively small diameter fluid conduit. In accordance with the second embodiment, when a particular section of the extrusion is separated from another section so as to define a tubular conduit of a predetermined length, the relatively large end portion of the tubular conduit can be readily connected to a relatively large diameter fluid conduit while the oppositely disposed relatively small portion of the tubular conduit can be readily connected to a relatively small diameter fluid conduit. Either one of the tubular fluid conduit embodiments may have a predetermined length dimension by cutting the tubular fluid conduits at desired positions along the axial or longitudinal extents thereof, or by separating sections of the tubular fluid conduits at predetermined perforated locations provided along the longitudinal or axial extents thereof.

BACKGROUND OF THE INVENTION

When an aircraft is located upon the ground and is being serviced, various services are required to be supplied to the aircraft, such as, for example, electrical power, pre-conditioned air, and the like. In connection with the provision of the pre-conditioned air to the aircraft, a suitable heating/air-conditioning unit is used, and accordingly, a first end portion of the tubular supply conduit is fluidically connected in an airtight manner to the heating/air-conditioning unit while a second end portion of the tubular supply conduit is fluidically connected in an airtight manner to a suitable air inlet port located on board the aircraft. The tubular conduit must be able to perform and remain flexible under various weather or environmental conditions, such as, for example, hot temperatures, cold temperatures, dry atmospheric conditions, humid atmospheric conditions, rain, snow, ice, and the like, and it must be capable of satisfying various operational parameters. For example, the tubular conduit must be sufficiently rugged and durable in view of the fact that it is often moved or dragged over the various regions of the tarmac or the ground areas surrounding the airport terminal. In addition, the tubular conduit must be capable of being easily and rapidly deployed, easily and rapidly stowed, and capable of being stored in a relatively compact state. Still yet further, it is necessary that such tubular fluid conduits be capable of being easily and readily fabricated so as to comprise various or different predetermined length dimensions.

Various means or methods of fabricating such tubular fluid conduits, having such different length dimensions, have been previously proposed, however, such conventional, PRIOR ART tubular fluid conduits are all basically or substantially similar in that separate tubular fluid conduit sections are adapted to be mated and secured together by means of various different fasteners. Examples of such conventional, PRIOR ART tubular fluid conduit systems, and the techniques for fabricating the same, are disclosed, for example, within U.S. Pat. No. 6,443,499 which issued to Jenum on Sep. 3, 2002, U.S. Pat. No. 6,286,876 which issued to Jasperse et al. on Sep. 11, 2001, and U.S. Pat. No. 5,368,341 which issued to Larson on Nov. 29, 1994. As can be readily appreciated from such PRIOR ART patents, separate adjacent sections of the overall tubular fluid conduit are attached together by means of, for example, zipper type fasteners, VELCRO® fasteners, and the like.

It can be further appreciated, however, that while such fabrication techniques are quite satisfactory from the viewpoint of initially fabricating, forming, or erecting the tubular fluid conduit, such fastening means do not truly address the additionally important issues of providing the overall tubular fluid conduit with means for effectively enabling the relatively easy and rapid deployment of the tubular fluid conduit, the relatively easy and rapid stowing of the tubular fluid conduit, or the capability of the tubular fluid conduit to be stored in a relatively compact mode and space. In addition, it is also noted that such conventional, PRIOR ART tubular fluid conduits have a predetermined, constant diametrical extent, and therefore, such tubular fluid conduits can only be utilized in connection with fluid flow systems which employ tubular fluid conduits having a predetermined constant diametrical extent. To the contrary, as is well known, for example, within the aircraft servicing industry, tubular fluid conduits utilized for supplying pre-conditioned air to aircraft being serviced need to comprise tubular fluid conduits which have relatively large and relatively small diametrical extents upon the oppositely disposed end portions thereof such that the tubular fluid conduits can effectively be fluidically connected both to the heating/air-conditioning supply unit as well as to the aircraft inlet port located on board the aircraft.

Accordingly, there is a need in the art for a new and improved tubular conduit which can be easily and rapidly deployed, which can be easily and rapidly stowed, which can be stored in a relatively compact mode or state, which can have any predetermined length dimension, and which can not only have predeterminedly desired or required diametrical dimensions but, in addition, may have different diametrical extents at the opposite ends thereof so as to easily and readily be capable of respectively interfacing with or attaching to both the heating/air-conditioning supply unit and the aircraft inlet port located on board the aircraft.

SUMMARY OF THE INVENTION

The foregoing and other objectives are achieved in accordance with the teachings and principles of the present invention through the provision of a new and improved tubular fluid conduit which is especially adapted for use in supplying pre-conditioned air to an aircraft while, for example, the aircraft is located upon the ground and being serviced, during which time the aircraft is unable to generate its own supply of conditioned air for the crew and passengers, wherein the tubular conduit may be fabricated, in accordance with a first embodiment, as a thermoplastic extrusion which has a constant diameter dimension that may be cut or separated to a predeterminedly desired length dimension, or which may be fabricated, in accordance with a second embodiment, as a thermoplastic extrusion which effectively has repetitive length sections which have both relatively large diameter and relatively small diameter sections. Both embodiment tubular fluid conduits may be cut or separated to predeterminedly desired length dimensions.

In the first instance, while the diametrical extent of the tubular fluid conduit extrusion is constant, the opposite end portions of the tubular fluid conduit extrusion may be respectively secured to fluid conduits, having different, relatively large and relatively small diametrical dimensions, by attaching one end portion of the tubular conduit extrusion to the relatively large diameter fluid conduit, while spirally gathering or folding the other end portion of the tubular conduit extrusion around the longitudinal axis thereof so as to be attached to the relatively small diameter fluid conduit. In the second instance, each repetitive length section has a relatively large diameter and relatively small diameter end portion formed or incorporated therein whereby, when a particular section of the extrusion is separated from another section, at the interface defined between one of the relatively large diameter portions and one of the relatively small diameter portions, so as to define a tubular conduit of a predetermined length, the relatively large end portion of the tubular conduit can be readily connected to a relatively large diameter fluid conduit while the oppositely disposed relatively small portion of the tubular conduit can be readily connected to a relatively small diameter fluid conduit. Since the tubular fluid conduit is fabricated as an extrusion in a flattened state, the tubular fluid conduit may be readily and easily folded, unfolded, or disposed upon a reel, in its flattened state, so as to be capable of being readily and easily deployed, stowed, or stored.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 1 is a schematic side elevational view of a first embodiment, constant diameter, new and improved tubular fluid conduit which has been fabricated in accordance with the principles and teachings of the present invention and which shows, not only the cooperative parts thereof, but in addition, different types of connectors for respectively operatively connecting the oppositely disposed end portions of the tubular fluid conduit to the output end portion of a fluid supply conduit and the input end portion of a fluid conduit to which the fluid is to be supplied;

FIG. 2 is a schematic top plan view of a second embodiment of a new and improved tubular fluid conduit which has been fabricated in accordance with the principles and teachings of the present invention and which shows the serial or sequential interconnection together of the different sections of the tubular fluid conduit which are separable from each other at the interfaces defined between the relatively large and relatively small diameter portions of each tubular fluid conduit section; and FIG. 3 is a schematic view of an inflatable bladder type clamping device for fixedly securing an end portion of a tubular fluid conduit to a fluid conduit inlet or outlet connector.

DETAILED DESCRIPTION OF THE ILLUSTRATED EMBODIMENTS

Referring now to the drawings, and more particularly to FIG. 1 thereof, a first embodiment of a new and improved tubular fluid conduit, especially adapted for supplying pre-conditioned air to aircraft while the aircraft is upon the ground and being serviced, and is therefore incapable of providing its own pre-conditioned air to the passengers and crew, is disclosed and is generally indicated by the reference character 10. More particularly, the new and improved tubular fluid conduit 10 is fabricated as a continuous tubular extrusion from a suitable thermoplastic material, such as, for example, polyethylene or polyvinyl, and may have a thickness dimension which may be within the range of, for example, five to seven mils (0.005-0.007"). The tubular fluid conduit 10 is extruded in the form of a flattened tubular member which may be folded, or coiled upon a reel, for easy stowage and storage purposes, and in accordance with the principles and teachings of the first embodiment of the present invention, the tubular fluid conduit extrusion 10 preferably has a constant diametrical extent or dimension of, for example, fourteen inches (14.00"). In this manner, the upstream end portion 12 of the tubular fluid conduit 10 can be readily and easily connected, by means of, for example, a suitable hose clamp type fastener 14 which is commonly used within air ducting systems, to the output port or to an outlet port connector 16 of a heating/air-conditioning supply unit which is adapted to supply pre-conditioned heated or cooled air to the aircraft.

In view of the fact that the new and improved tubular fluid conduit 10 is fabricated as a continuous tubular extrusion, it can be fabricated so as to have any predetermined length dimension as may be required for any particular air hose application in connection with the servicing of particular aircraft, and subsequently, the tubular extrusion may simply be cut, by means of a suitable cutting tool, not shown, at an appropriate axial position, as taken along the axial or longitudinal extent or length thereof, so as to provide the tubular fluid conduit 10 with the predetermined length dimension as required. Alternatively, the continuous tubular extrusion may be provided with a plurality of transversely oriented separable or frangible perforations 18 at predetermined locations along the axial or longitudinal extent or length thereof which effectively divide the continuous tubular extrusion into a plurality of successive, integrally connected sections 11, 11. The tubular fluid conduit 10 can thereby have a predetermined finite length by separating a predetermined number of the sections 11, 11 of the tubular extrusion from the overall tubular extrusion so as to facilitate the achievement of a tubular fluid conduit 10, characterized by means of a predetermined length dimension, as may be required, without the need for cutting or severing the same. The intervals defined between successive perforations 18 may likewise be predetermined, whereby, for example, the perforations 18 may be spaced from each other through means of distances comprising thirty, fifty, sixty, one hundred feet, or the like.

As has been additionally noted hereinbefore, the tubular fluid conduit extrusion has a constant diametrical extent or dimension, and therefore, since the pre-conditioned air inlet port or inlet port adaptor conventionally located on board the aircraft normally has a diametrical extent of approximately eight inches (8.00"), the downstream end portion 20 of the tubular fluid conduit 10 must be adapted for connection to the pre-conditioned air inlet port or inlet port connector 22 located on board the aircraft in order to operatively and fluidically connect the downstream end portion 18 of the tubular fluid conduit 10 to the pre-conditioned air inlet port or inlet port connector 22 located on board the aircraft. In accordance with the principles and teachings of the present invention, this is readily and simply accomplished by effectively spirally coiling the downstream end portion 20 of the tubular fluid conduit 10 around its longitudinal axis 24, as disclosed at 26, in a manner that one conventionally spirally coils the large material end of a collapsed umbrella in order to secure the collapsed material of the umbrella around the umbrella framework or handle. Subsequently, the spirally coiled downstream end portion 26 of the tubular fluid conduit 10 can be fixedly secured upon air inlet port or inlet port connector 22 by means of a suitable fastener 28, such as, for example, an O-ring member or other band type fastener. It can therefore be appreciated that in accordance with the principles and teachings of the present invention, while the originally fabricated tubular fluid conduit extrusion may have a relatively large constant diametrical extent or dimension whereby a first end portion of the tubular fluid conduit 10 can be readily and easily operatively and fluidically connected to a first, relatively large diameter fluid duct or conduit, the second, oppositely disposed end portion of the tubular fluid conduit 10 can be easily and readily reformed so as to effectively reduce the diametrical extent or dimension thereof in order to easily and readily adapt the same for operative and fluid connection to a fluid conduit having a relatively smaller diametrical extent or dimension.

With reference now being made to FIG. 2, a second embodiment of a new and improved tubular fluid conduit, which is also especially adapted for supplying pre-conditioned air to aircraft while the aircraft is upon the ground and being serviced, and is therefore incapable of providing its own pre-conditioned air to the passengers and crew, is disclosed and is generally indicated by the reference character 110. The second embodiment tubular fluid conduit 110 is conceptually similar to the first embodiment tubular fluid conduit 10 as disclosed within FIG. 1, and therefore the various component parts of the second embodiment tubular fluid conduit 110, that correspond to the component parts of the first embodiment tubular fluid conduit 10, will be designated by corresponding reference characters except that the reference characters will be within the 100 series. More particularly, the second embodiment tubular fluid conduit 110, in a manner similar to that of the first tubular fluid conduit 10, comprises a continuous tubular extrusion fabricated from a suitable thermoplastic material, such as, for example, polyethylene or polyvinyl, and may likewise have a thickness dimension which may be within the range of, for example, five to seven mils (0.005-0.007"). The second embodiment tubular fluid conduit 110 is also preferably extruded in the form of a flattened tubular member which may be folded, or coiled upon a reel, for easy stowage and storage purposes, however, in accordance with the principles and teachings of the second embodiment tubular fluid conduit 110 of the present invention, and contrary to the structure comprising the first embodiment tubular fluid conduit extrusion 10, the second embodiment tubular fluid conduit extrusion 110 is fabricated in the form of serially or sequentially connected sections 111 wherein each one of the sections 111 comprises a relatively large diameter upstream end portion 112 and a relatively small diameter downstream end portion 120. Alternatively, the second embodiment tubular fluid conduit extrusion 110 could be fabricated so as to comprise only a single section 111 having a relatively large diameter upstream end portion 112 and a relatively small diameter downstream end portion 120.

More particularly, the relatively large diameter upstream end portion 112 of the second embodiment tubular fluid conduit 110 preferably has a diametrical extent or dimension of, for example, fourteen inches (14.00"), and in this manner, the upstream end portion 112 of the tubular fluid conduit 110 can be readily and easily connected, by means of, for example, a suitable hose clamp type fastener, which may be similar to the hose clamp type fastener 14, as disclosed within FIG. 1, to the output port or to an outlet port connector, similar to the output port or to the outlet port connector 16, also as disclosed within FIG. 1, of a heating/air-conditioning supply unit which is adapted to supply pre-conditioned heated or cooled air to the aircraft. In a similar manner, since the pre-conditioned air inlet port or inlet port adaptor conventionally located on board the aircraft, similar to that illustrated within FIG. 1 as at 22, normally has a diametrical extent of approximately eight inches (8.00"), the downstream end portion 120 of the tubular fluid conduit 110 is therefore provided with a diametrical extent or dimension of approximately eight inches (8.00"), and subsequently, the relatively small downstream end portion 120 of the tubular fluid conduit 110 can be fixedly secured upon the air inlet port or inlet port connector, similar to the air inlet port or inlet port connector 22 as illustrated within FIG. 1, by means of a suitable fastener, such as, for example, an O-ring member or other band type fastener similar to the O-ring member or other band type fastener 28 as is also illustrated within FIG. 1.

With reference continuing to be made to FIG. 2, it can be appreciated further that in accordance with the principles and teachings of the second embodiment tubular fluid conduit 110 of the present invention, in addition to the provision of the relatively large diameter upstream end portion 112 and the relatively small diameter downstream end portion 120, the tubular fluid conduit extrusion also comprises a relatively large constant diameter body section 113, and a tapered transition section 126 which effectively integrally interconnects the relatively large diameter body section 113 to the relatively small diameter downstream end portion 120. It is to be noted still further that the new and improved second embodiment tubular fluid conduit 110, similar to the first embodiment tubular fluid conduit 10, is adapted to be fabricated as a continuous tubular extrusion and can therefore be fabricated so as to have any predetermined length dimension, as may be required for any particular air hose application in connection with the servicing of particular aircraft, depending upon how many sections 111 are effectively incorporated within the particular tubular fluid conduit 110.

More particularly, as was also the case with the first tubular fluid conduit extrusion, in order to form a tubular fluid conduit 110 having a predetermined length dimension, the second tubular fluid conduit extrusion may simply be cut at the interface defined between any pair of mating upstream end portion 112 and downstream end portion 120, by means of a suitable cutting tool, not shown. Alternatively, the continuous tubular fluid conduit extrusion may be provided with separable or frangible perforations 118 at predetermined locations along the axial or longitudinal length or extent thereof so as to facilitate the achievement of a tubular fluid conduit 110, characterized by means of a predetermined length dimension, as may be required, without the need for cutting or severing the same. The intervals defined between successive perforations 118 may likewise be predetermined, whereby, for example, the perforations 118 may be spaced from each other through means of distances comprising thirty, fifty, sixty, one hundred feet, or the like.

In connection with the actual use of either one of the first or second embodiment tubular fluid conduits 10, 110 as respectively disclosed within FIG. 1 and 2, it is to be noted that, in view of the relatively inexpensive and relatively simplistic structure comprising both of the first or second embodiment tubular fluid conduits 10, 110, both of the first or second embodiment tubular fluid conduits 10, 110 are adapted to be disposable, that is, intended for one-time usage, or alternatively, both of the first or second embodiment tubular fluid conduits 10, 110 are adapted to be semi-disposable, that is, intended for multiple-time but relatively limited usage. The one-time usage of both of the first or second embodiment tubular fluid conduits 10, 110 is submitted to be self-explanatory, that is, after a single use, the particular tubular fluid conduit 10, 110 can be discarded and replaced as necessary, and therefore, a further in-depth explanation or discussion of the same is submitted to not be required. On the other hand, or alternatively, when either one of the first or second embodiment tubular fluid conduits 10, 110 is effectively adapted to be semi-disposable, that is, they are intended for multiple-time but relatively limited usage, the particular one of the first or second embodiment tubular fluid conduits 10, 110 is adapted to be used a predetermined number of times, and then discarded and replaced, or alternatively, the particular one of the first or second embodiment tubular fluid conduits 10, 110 is adapted to be used until the particular tubular fluid conduit 10, 110 is damaged. In the latter instance, the damaged portion of the tubular fluid conduit 10, 110 can be patched or otherwise repaired, if possible. Alternatively, the particular length dimension of the tubular fluid conduit 10, 110 can intentionally be made longer than is actually necessary such that if, for example, the end portion or section of the tubular fluid conduit 10, which is operatively or fluidically connected either to the output port or to the outlet port connector 16 of the heating/air-conditioning supply unit, or to the pre-conditioned air inlet port or inlet port connector 22 located on board the aircraft, becomes damaged and cannot be patched or repaired, then the end portion of the first embodiment tubular fluid conduit 10 that is attached to the output port or to the outlet port connector 16 of the heating/air-conditioning supply unit, or to the pre-conditioned air inlet port or inlet port connector 22 located on board the aircraft, can simply be severed or separated, and the new or fresh, undamaged end portion of the tubular fluid conduit 10 is reattached to the output port or to the outlet port connector 16 of the heating/air-conditioning supply unit, or to the pre-conditioned air inlet port or inlet port connector 22 located on board the aircraft, in the manner illustrated in FIG. 1.

In a similar manner, in connection with the second embodiment tubular fluid conduit 110, if, for example, the end portion or section of the second embodiment tubular fluid conduit 110, that is operatively or fluidically connected either to the output port or to the outlet port connector of the heating/air-conditioning supply unit, or to the pre-conditioned air inlet port or inlet port connector located on board the aircraft, becomes damaged and cannot be patched or repaired, then the end portion of the second embodiment tubular fluid conduit 110 that is attached to the output port or to the outlet port connector of the heating/air-conditioning supply unit, or to the pre-conditioned air inlet port or inlet port connector located on board the aircraft, is simply severed or separated at the closest interface or perforation 118 defined between the mating relatively large diameter upstream end portion 112 and the relatively small diameter downstream end portion 120, and the new or fresh, undamaged end portion of the second embodiment tubular fluid conduit 110 can effectively be reattached to the output port or to the outlet port connector of the heating/air-conditioning supply unit, or to the pre-conditioned air inlet port or inlet port connector located on board the aircraft, in a manner similar to that illustrated within FIG. 1.

With reference now being lastly made to FIG. 3, a fastener assembly, unlike either one of the fasteners 14 or 28 utilized for connecting an end portion of either one of the first or second embodiment tubular fluid conduits 10, 110 as respectively illustrated within FIGS. 1 and 2, is disclosed and is generally indicated by the reference character 250. While the fastener assembly 250 is being illustrated in FIG. 3 for use in connection with, for example, the securing of the relatively small diameter end portions 20, 120 of the tubular fluid conduits 10, 110 upon the inlet port or inlet port connector 22 located on board the aircraft, the fastener assembly 250 can likewise be used to secure either one of the relatively large diameter end portions 12, 112 of the tubular fluid conduits 10, 110 upon the outlet port or outlet port connector 16 of the heating/air-conditioning supply unit. More particularly, the fastener assembly 250 is seen to comprise an annular pneumatically inflatable bladder 252 to which there is integrally connected an air inflation valve 254. The small diameter end portion, such as, for example, either end portion 20 or 120, of either one of the first or second embodiment tubular fluid conduits 10, 110 is adapted to be inserted, in a sleeve-like manner, over, for example, the inlet port or inlet port connector 22 which is located on board the aircraft, and the inflatable bladder 252 is, in turn, slid over the structural assembly, comprising the small diameter end portion 20, 120 of either one of the first or second embodiment tubular fluid conduits 10, 110 and the inlet port or inlet port connector 22 located upon the aircraft, so as to effectively entrap the small diameter end portion 20, 120 of the first or second embodiment tubular fluid conduits 10, 110 between the internal peripheral wall portion of the annular inflatable bladder 252 and the external peripheral wall portion of the inlet port or inlet port connector 22.

Accordingly, when the inflatable bladder 252 is inflated as a result of admitting air pressure thereinto by means of the air inflation valve 254, the small diameter end portion 20, 120 of the first or second embodiment tubular fluid conduits 10, 110 will be fixedly secured upon the external peripheral wall portion of the inlet port or inlet port connector 22. Alternatively, when the small diameter end portion 20, 120 of the first or second embodiment tubular fluid conduits 10, 110 is to be removed from the external peripheral wall portion of the inlet port or inlet port connector 22, the process is effectively reversed by initially deflating the inflatable bladder 252 so as to permit the release of the entrapped small diameter end portion 20, 120 of the first or second embodiment tubular fluid conduits 10, 110 between the internal peripheral wall portion of the annular inflatable bladder 252 and the external peripheral wall portion of the inlet port or inlet port connector 22, and subsequently removing the small diameter end portion 20, 120 of the first or second embodiment tubular fluid conduits 10, 110 from the external peripheral wall portion of the inlet port or inlet port connector 22.

Thus, it may be seen that in accordance with the teachings and principles of the present invention, there has been disclosed a new and improved tubular fluid conduit which is especially adapted for use in supplying pre-conditioned air to an aircraft while, for example, the aircraft is located upon the ground and being serviced, during which time the aircraft is unable to generate its own supply of conditioned air for the crew and passengers, wherein the tubular conduit may be fabricated, in accordance with a first embodiment, as a thermoplastic extrusion which has a constant diameter dimension that may be cut or separated to a predeterminedly desired length dimension, or which may be fabricated, in accordance with a second embodiment, as a thermoplastic extrusion which effectively has repetitive length sections which have both relatively large diameter and relatively small diameter sections. The end portion of the first embodiment tubular fluid conduit that is to be connected to a relatively small port or connector may simply be spirally wrapped around its longitudinal axis, and both embodiment tubular fluid conduits may be cut or separated to predeterminedly desired length dimensions. In addition to conventional fasteners that may be utilized to secure the opposite end portions of the tubular fluid conduits upon the inlet and outlet ports or connectors associated with the aircraft and pre-conditioned air supply unit, an inflatable bladder type fastener, constructed in accordance with the principles and teachings of the present invention, may likewise be utilized. The tubular fluid conduits also comprise structures which are capable of being readily and easily deployed, stowed, or stored.

Obviously, many variations and modifications of the present invention are possible in light of the above teachings. It is therefore to be understood that within the scope of the appended claims, the present invention may be practiced otherwise than as specifically described herein.

The invention claimed is:

1. A tubular conduit, comprising:
a thermoplastic tubular extrusion having a longitudinal axis;
said thermoplastic tubular extrusion having a first end portion thereof which defines a relatively large diametrical extent for permitting said first end portion of said thermoplastic tubular extrusion to be connected to a first conduit connection having a relatively large diametrical extent; and
said thermoplastic tubular extrusion having a second end portion thereof which defines a relatively small diametrical extent for permitting said second end portion of said thermoplastic tubular extrusion to be connected to a second conduit connection having a relatively small diametrical extent, wherein said relatively large diametrical extent is substantially larger than said relatively small diametrical extent;
wherein said second end portion of said thermoplastic tubular extrusion is spirally coiled around said longitudinal axis of said thermoplastic tubular extrusion so as to define said relatively small diametrical extent of said thermoplastic tubular extrusion at said second end portion of said thermoplastic tubular extrusion.

2. The tubular conduit as set forth in claim 1, wherein:
said thermoplastic tubular extrusion has a constant diametrical extent throughout the longitudinal extent of said thermoplastic tubular extrusion wherein said constant diametrical extent is equal to and defines said relatively large diametrical extent of said thermoplastic tubular extrusion at said first end portion of said thermoplastic tubular extrusion.

3. The tubular conduit as set forth in claim 1, further comprising:
a frangible region defined within said thermoplastic tubular extrusion at predetermined axial positions spaced along said longitudinal axis of said thermoplastic tubular extrusion so as to effectively divide said thermoplastic tubular extrusion into a plurality of successive, integrally connected sections and thereby permit said tubular conduit to have a predetermined finite length by separating a predetermined number of sections of said thermoplastic tubular extrusion from said thermoplastic tubular extrusion.

4. The tubular conduit as set forth in claim 3, wherein:
said frangible region comprises perforations extending transversely across the longitudinal extent of said thermoplastic tubular extrusion.

5. The tubular conduit as set forth in claim 1, wherein said thermoplastic tubular extrusion comprises:
said first end portion has said relatively large diametrical extent defined therein;
said second end portion has said relatively small diametrical extent defined therein; and
a transition section integrally interconnects said relatively large diametrical extent first end portion to said relatively small diametrical extent second end portion.

6. The tubular conduit as set forth in claim 1, wherein:
said tubular conduit comprises a plurality of successive sections integrally connected together;
wherein each one of said sections comprises a first end portion having said relatively large diametrical extent defined therein, a second end portion having said relatively small diametrical extent defined therein, and a transition section which integrally interconnects said relatively large diametrical extent first end portion to said relatively small diametrical extent second end portion.

7. The tubular conduit as set forth in claim 6, wherein:
said plurality of successive sections of said tubular conduit are integrally connected together at the junctions of said first and second end portions of successive ones of said plurality of successive sections of said tubular conduit in such a manner that said second end portion, having said relatively small diametrical extent defined therein, of a first one of said plurality of successively connected sections of said tubular conduit is integrally connected to said first end portion, having said relatively large diametrical extent defined therein, of a second one of said plurality of successively connected sections of said tubular conduit.

8. The tubular conduit as set forth in claim 7, further comprising:
a frangible region defined within said thermoplastic tubular extrusion at predetermined axial positions spaced along said longitudinal axis of said thermoplastic tubular extrusion and corresponding to said junctions defined between said plurality of successively connected sections of said tubular conduit so as to effectively divide said thermoplastic tubular extrusion into said plurality of successive, integrally connected sections and thereby permit said tubular conduit to have a predetermined finite length by separating a predetermined number of sections of said thermoplastic tubular extrusion from said thermoplastic tubular extrusion.

9. The tubular conduit as set forth in claim 1, wherein:
said tubular conduit comprises a tubular fluid conduit for conducting pre-conditioned air from a source of pre-conditioned air to an aircraft ventilation system.

10. A method of making tubular conduit, comprising the steps of:
forming a thermoplastic tubular extrusion along a longitudinal axis;
providing said thermoplastic tubular extrusion with a first end portion which defines a relatively large diametrical extent for permitting said first end portion of said thermoplastic tubular extrusion to be connected to a first conduit connection having a relatively large diametrical extent; forming said thermoplastic tubular extrusion with a second end portion thereof which defines a relatively small diametrical extent for permitting said second end portion of said thermoplastic tubular extrusion to be connected to a second conduit connection having a relatively small diametrical extent, wherein said relatively large diametrical extent is substantially larger than said relatively small diametrical extent; and at least one of:
spirally coiling said second end portion of said thermoplastic tubular extrusion around said longitudinal axis of said thermoplastic tubular extrusion so as to define said relatively small diametrical extent of said thermoplastic tubular extrusion at said second end portion of said thermoplastic tubular extrusion, or providing frangible regions within said thermoplastic tubular extrusion at predetermined axial positions spaced along said longitudinal axis of said thermoplastic tubular extrusion so as to effectively divide said thermoplastic tubular extrusion into a plurality of successive, integrally connected sections and thereby permit said tubular conduit to have a predetermined finite length by separating a predetermined number of sections of said thermoplastic tubular extrusion from said thermoplastic tubular extrusion.

11. The method as set forth in claim 10, further comprising the steps of:
providing said thermoplastic tubular extrusion with a constant diametrical extent throughout the longitudinal extent of said thermoplastic tubular extrusion wherein said constant diametrical extent is equal to and defines said relatively large diametrical extent of said thermoplastic tubular extrusion at said first end portion of said thermoplastic tubular extrusion; and spirally coiling said second end portion of said thermoplastic tubular extrusion around said longitudinal axis of said thermoplastic tubular extrusion so as to define said relatively small diametrical extent of said thermoplastic tubular extrusion at said second end portion of said thermoplastic tubular extrusion.

12. The method as set forth in claim 10, further comprising:
providing the frangible regions within said thermoplastic tubular extrusion at the predetermined axial positions spaced along said longitudinal axis of said thermoplastic tubular extrusion.

13. The method as set forth in claim 10, further comprising the steps of:

providing said first end portion of said thermoplastic tubular extrusion with said relatively large diametrical extent;

providing said second end portion of said thermoplastic tubular extrusion with said relatively small diametrical extent; and integrally connecting said relatively large diametrical extent first end portion to said relatively small diametrical extent second end portion by a transition section.

14. The method as set forth in claim 10, further comprising the step of:
forming said thermoplastic tubular extrusion such that said thermoplastic tubular extrusion comprises the plurality of successive, integrally connected sections;

wherein each one of said sections comprises a first end portion having said relatively large diametrical extent defined therein, a second end portion having said relatively small diametrical extent defined therein, and a transition section which integrally interconnects said relatively large diametrical extent first end portion to said relatively small diametrical extent second end portion.

15. The method as set forth in claim 14, further comprising the step of:
integrally connecting together said plurality of successive, integrally connected sections of said thermoplastic tubular extrusion at the junctions of said first and second end portions of successive ones of said plurality of successive sections of said tubular conduit in such a manner that said second end portion, having said relatively small diametrical extent defined therein, of a first one of said plurality of successive, integrally connected sections of said tubular conduit is integrally connected to said first end portion, having said relatively large diametrical extent defined therein, of a second one of said plurality of successive, integrally connected sections of said tubular conduit.

16. The method as set forth in claim 10, further comprising the step of:
providing the frangible regions within said thermoplastic tubular extrusion at the predetermined axial positions spaced along said longitudinal axis of said thermoplastic tubular extrusion so as to effectively divide said thermoplastic tubular extrusion into said plurality of successive, integrally connected sections and thereby permit said tubular conduit to have the predetermined finite length by separating the predetermined number of sections of said thermoplastic tubular extrusion from said thermoplastic tubular extrusion.

* * * * *